United States Patent

Poweleit

[15] 3,642,048
[45] Feb. 15, 1972

[54] WHEEL ASSEMBLY FOR TOY VEHICLES

[72] Inventor: Wilhelm Poweleit, Korbacher Str. 7, Brilon-Wald, Germany

[22] Filed: Mar. 26, 1970

[21] Appl. No.: 23,007

[30] Foreign Application Priority Data

Mar. 26, 1969 Germany......................P 19 15 443.9

[52] U.S. Cl..............................152/323, 46/221, 152/379, 301/63 R
[51] Int. Cl. ......................................................B60f 9/00
[58] Field of Search............301/63 R, 63 PW; 152/379, 383, 152/352, 323; 46/221

[56] References Cited

UNITED STATES PATENTS

| 532,950 | 1/1895 | Erickson | 152/379 |
| 2,713,373 | 7/1955 | Daugherty | 152/384 |
| 3,470,933 | 10/1969 | Molnar | 301/63 X |

FOREIGN PATENTS OR APPLICATIONS

| 735,242 | 5/1966 | Canada | 152/352 |

Primary Examiner—Richard J. Johnson
Attorney—Browdy and Neimark

[57] ABSTRACT

The wheel assembly described is formed of a wheel and a hollow tire held firmly on the wheel rim by cooperating securing means including two axially outwardly open grooves extending circumferentially in a back-to-back relationship about the periphery of the wheel as an integral part thereof and two axially inwardly projecting and circumferentially extending legs forming an integral part of the tire. The free terminus of each leg snugly fits into said grooves.

3 Claims, 3 Drawing Figures

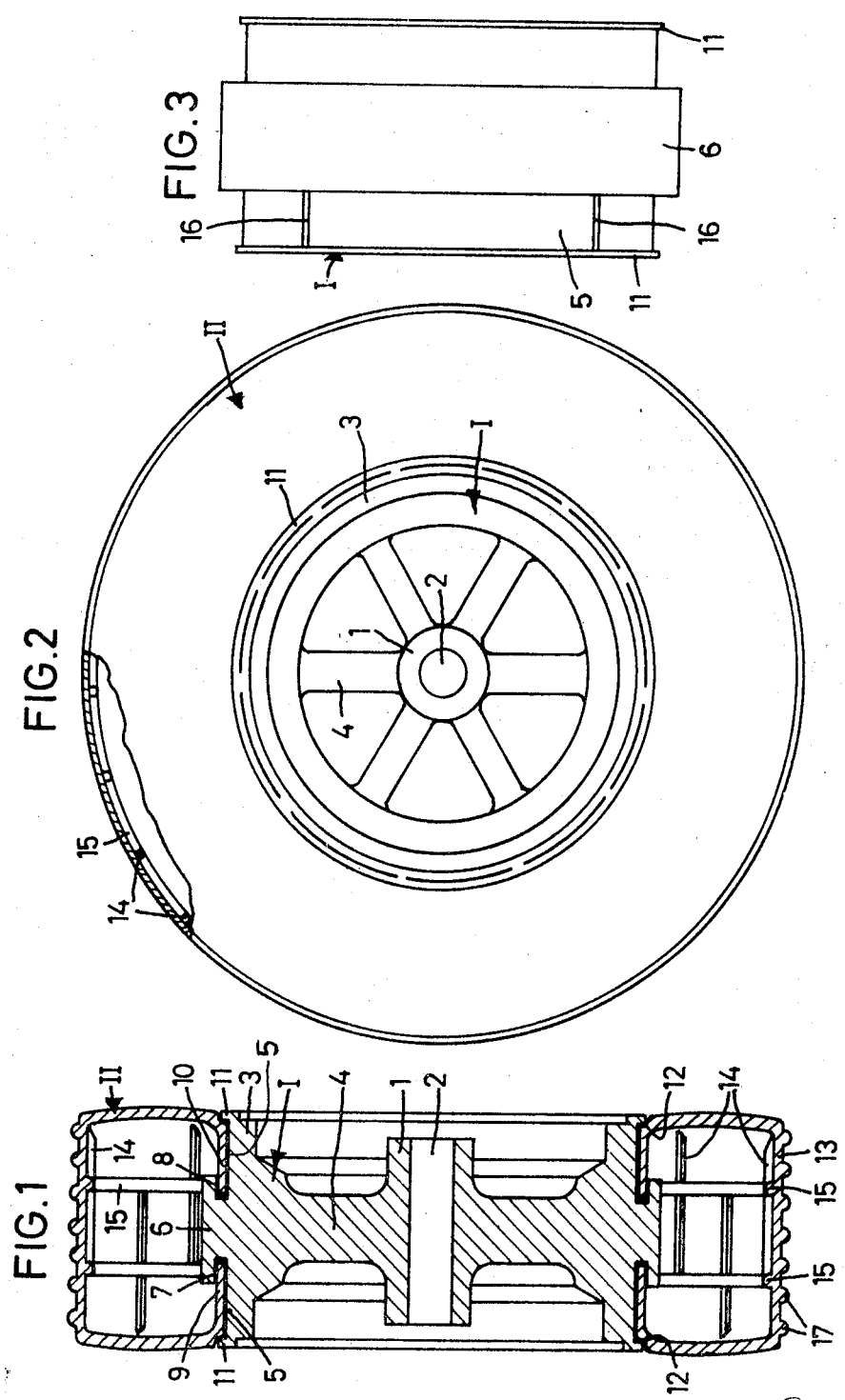

3,642,048

WHEEL ASSEMBLY FOR TOY VEHICLES

BACKGROUND OF THE INVENTION

This invention relates to a wheel assembly for toy vehicles and is of the type that comprises a wheel and an elastic tire held on the wheel rim. Known wheel assemblies of this type include a tire of solid cross section which results in a relatively heavy structure.

OBJECTS AND SUMMARY OF THE INVENTION

It is an object of the invention to provide an improved wheel assembly for toy vehicles, the tire of which better simulates an inflated vehicle tire.

It is another object of the invention to provide an improved wheel assembly for toy vehicles that has a lightweight construction.

It is a further object of the invention to provide an improved wheel assembly for toy vehicles including simple means for securely maintaining the tire on the wheel rim so that accidental separation of the tire from the wheel during normal use may not occur.

Briefly stated, according to the invention, there is provided a wheel assembly which comprises, on the one hand, a hollow tire having two axially inwardly directed free legs and, on the other hand, a wheel, along the rim face of which there are provided—on either side of a symmetry plane normal to the wheel axis—two axially outwardly open circumferential grooves in which the free ends of said legs may nest with a snug fit.

The invention will be better understood and further objects as well as advantages will become more apparent from the ensuing detailed specification of a preferred, although exemplary embodiment of the invention taken in conjunction with the drawings.

BRIEF DESCRIPTION OF THE DRAWING

FIG. 1 is a sectional view of a wheel assembly according to the preferred embodiment of the invention;

FIG. 2 is a side elevational view of the same embodiment and

FIG. 3 is a plan view of the same embodiment with the tire removed.

DESCRIPTION OF THE PREFERRED EMBODIMENT

Turning now to FIGS. 1 and 2, the toy wheel assembly according to the invention comprises a wheel generally indicated at I and, mounted thereon, a hollow tire generally indicated at II.

The wheel I comprises a hub 1 provided with an axle bore 2 and a rim 3 held concentrically about hub 1 by means of a plurality of radially extending spokes 4. The wheel may be in the shape of a hub cap, as known in itself. The peripheral cylindrical rim face is indicated at 5. The wheel I is further provided with an integral peripheral ring 6 which projects radially beyond the rim face 5 and which has a T-shaped cross section. Portions of the side of ring 6 and rim face 5 define two parallel, axially outwardly open circumferential grooves 7 and 8 arranged back-to-back adjacent either side of a plane of symmetry normal to the wheel axis.

The hollow tire II, made of rubber, soft PVC or other elastic material, is of a generally U-shaped cross section and has two axially inwardly directed, freely movable legs 9 and 10.

For securely attaching the tire II to wheel I, the free end portions of legs 9 and 10 are axially inserted into the respective grooves 7 and 8, in which they are held with a snug fit. At the same time, the cylindrical underside of legs 9, 10, lie in contact with the cylindrical rim face 5.

The above-described firm securing means between the wheel I and the hollow tire II ensures that no accidental separation between these two components may occur. Yet, despite such firmness of the securing means, the tire preserves its elasticity to simulate an inflated tire in a manner superior to conventional solid rubber or solid plastic tires.

The use of a hollow tire together with the simple securing means described above result in a substantial reduction of the overall weight of the wheel assembly as compared with structures of the prior art.

In order to provide a support for the tire II against substantial axial forces to which it may be exposed particularly if the wheel assembly is used in toy racing cars, both edges of the rim 3 are provided with radially outwardly projecting flanges 11 fitting into complemental circumferential depressions 12 in the tire II. At the same time, flanges 11 also support the tire against radial forces. It is noted that, for the purpose of imitating racing car tires, the tire II may have a relatively wide running face.

The wall thickness of the tire II may be held at a particularly low value by providing the inner face of the tire wall with ribs 14 which extend transversally on the reverse side of the running face 13 and/or with longitudinal, circumferentially extending ribs 15 of a desired pattern. The running face 13 of the tire II has axially spaced, circumferential ribs 17.

In case relatively large forces are exerted on the tire II, the latter is compressed to such an extent that air is expelled from the inside thereof. If there is an uninterrupted, hermetic engagement between the underside of legs 9, 10 and the rim face 5, upon removing said forces, air is prevented from reentering the tire and, as a result, a permanent deformation thereof occurs. To prevent such an occurrence, the face 5 is provided, unilaterally or bilaterally of ring 6, with circumferentially spaced, axially extending ribs 16, as shown in FIG. 3. The ribs 16, however, are sufficiently small in height (radial dimension) and in number, so that the legs 9, 10 lie in form contact with the rim face 5, whereby a sudden escape of air is prevented even in case of relatively large loads on the tire. In this manner the simulation of a real inflated tire is further improved.

What is claimed is:

1. A wheel assembly for toy vehicles, said assembly comprising:
   a wheel including a rim provided with a generally cylindrical peripheral rim face and a substantially centrally disposed circumferentially T-shaped ring integral with said rim and projecting radially beyond said rim face with the side portions of said ring and portions of said rim face defining two axially outwardly open back-to-back circumferential grooves, two radially outwardly extending circumferential flanges, one flange provided along each free edge of said rim, and at least one rib extending axially in said rim face and projecting slightly beyond the surface thereof; and
   a hollow elastic tire including two axially inwardly directed circumferential legs each having a free end, said legs engaging said rim face and lying over said rib with said rib interrupting hermetic engagement between said legs and said rim face upon deformation of said hollow tire due to expulsion of air from the inside thereof, said legs extending with their respective ends into said grooves, and two circumferential depressions provided in said tire in alignment with said radially outward extending flanges of said rim, said flanges engaging said tire by extending into said depressions.

2. A wheel assembly as defined in claim 1, including circumferentially spaced transverse ribs provided in said tire at the reverse side of the running face thereof.

3. A wheel assembly as defined in claim 1, including longitudinal circumferential ribs provided in the inner wall face of said tire.

* * * * *